United States Patent
Rademacher et al.

(10) Patent No.: US 9,394,456 B2
(45) Date of Patent: *Jul. 19, 2016

(54) LATEX EMULSIONS AND COATING COMPOSITIONS FORMED FROM LATEX EMULSIONS

(71) Applicant: AKZO NOBEL COATINGS INTERNATIONAL B.V., Arnhem (NL)

(72) Inventors: Jude Thomas Rademacher, Akron, OH (US); Gary Charles Pompignano, Wadsworth, OH (US); Willy P Kulhanek, Cuyahoga Falls, OH (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/278,054

(22) Filed: May 15, 2014

(65) Prior Publication Data

US 2014/0249270 A1    Sep. 4, 2014

Related U.S. Application Data

(63) Continuation of application No. 13/147,310, filed as application No. PCT/EP2010/052174 on Feb. 22, 2010.

(60) Provisional application No. 61/154,924, filed on Feb. 24, 2009.

(51) Int. Cl.
  *C09D 133/04*   (2006.01)
  *C09D 133/06*   (2006.01)
  *C09D 125/14*   (2006.01)

(52) U.S. Cl.
  CPC .......... *C09D 133/068* (2013.01); *C09D 125/14* (2013.01); *C09D 133/066* (2013.01); *C08L 2201/54* (2013.01); *C08L 2312/00* (2013.01)

(58) Field of Classification Search
  CPC ............. C09D 125/14; C09D 133/066; C09D 133/068; C08F 212/08; C08F 220/06
  USPC .................... 524/745, 832, 811, 82
  See application file for complete search history.

(56) References Cited

U.S. PATENT DOCUMENTS

| | | |
|---|---|---|
| 2,967,162 A | 1/1961 | Vasta |
| 3,248,356 A | 4/1966 | Snyder |
| 3,390,206 A | 6/1968 | Thompson et al. |
| 4,199,622 A | 4/1980 | Kokumai et al. |
| 4,289,674 A | 9/1981 | Christenson et al. |
| 4,567,246 A | 1/1986 | Gajria et al. |
| 4,692,491 A | 9/1987 | Ranka et al. |
| 4,871,810 A | 10/1989 | Saltman |
| 4,898,911 A | 2/1990 | Miyashita et al. |
| 4,906,684 A | 3/1990 | Say |
| 4,948,834 A | 8/1990 | Baker et al. |
| 5,043,380 A | 8/1991 | Cole |
| 5,082,742 A | 1/1992 | Padwa |
| 5,157,078 A | 10/1992 | Woo et al. |
| 5,629,376 A | 5/1997 | Sargent et al. |
| 5,686,140 A | 11/1997 | Stoffel |
| 5,714,539 A | 2/1998 | Perez et al. |
| 5,811,484 A | 9/1998 | Wilfinger et al. |
| 6,040,062 A | 3/2000 | McGee et al. |
| 6,197,878 B1 | 3/2001 | Murray et al. |
| 7,189,787 B2 | 3/2007 | O'Brien et al. |
| 7,592,047 B2 | 9/2009 | O'Brien et al. |
| 7,645,521 B2 | 1/2010 | Wevers et al. |
| 7,858,162 B2 | 12/2010 | Fuhry et al. |
| 7,923,513 B2 | 4/2011 | Killilea et al. |
| 2002/0147270 A1 | 10/2002 | Kuo et al. |

(Continued)

FOREIGN PATENT DOCUMENTS

| DE | 102 25 367 C1 | 9/2003 |
|---|---|---|
| EP | 1 371 689 A1 | 12/2003 |

(Continued)

OTHER PUBLICATIONS

European Search Report dated Jul. 30, 2009 for Application No. EP 09 15 5735.

(Continued)

*Primary Examiner* — Edward Cain
(74) *Attorney, Agent, or Firm* — Alice C. Su

(57) ABSTRACT

Latex emulsions are disclosed which can be used in the formation of coating compositions that are not water sensitive, have good blush resistance and retortability. In some embodiments, the coating compositions are used to coat substrates such as cans and packaging materials for the storage of food and beverages. Coating compositions can be prepared by mixing an ethylenically unsaturated monomer component and a stabilizer comprising a strong acid, in a carrier to form a monomer emulsion, reacting the monomer emulsion with an initiator to form the latex emulsion, and reacting the latex emulsion with a neutralizer. Methods of coating substrates with the coating compositions, and substrates coated with the coating compositions are also disclosed. The latex emulsions can be prepared by mixing an ethylenically unsaturated monomer component and a stabilizer comprising a strong acid, in a carrier to form a monomer emulsion, and reacting the monomer emulsion with an initiator to form the latex emulsion, wherein the stabilizer is present in an amount from about 0.1 to about 2.0 by weight polymeric solids.

23 Claims, No Drawings

(56) References Cited

U.S. PATENT DOCUMENTS

| | | |
|---|---|---|
| 2002/0161108 A1 | 10/2002 | Schultz et al. |
| 2003/0064185 A1 | 4/2003 | Mazza et al. |
| 2003/0187128 A1 | 10/2003 | Shiba et al. |
| 2004/0259989 A1 | 12/2004 | O'Brien et al. |
| 2005/0196629 A1 | 9/2005 | Bariatinsky et al. |
| 2005/0282957 A1 | 12/2005 | Parker et al. |
| 2006/0100366 A1 | 5/2006 | O'Brien et al. |
| 2007/0017440 A1 | 1/2007 | Tang et al. |
| 2007/0036903 A1 | 2/2007 | Mayr et al. |
| 2007/0117928 A1 | 5/2007 | O'Brien et al. |
| 2007/0281179 A1 | 12/2007 | Ambrose et al. |
| 2008/0299343 A1 | 12/2008 | Vogt et al. |
| 2010/0093913 A1 | 4/2010 | Jones et al. |
| 2011/0195263 A1 | 8/2011 | Malotky et al. |
| 2011/0207850 A1 | 8/2011 | Kan et al. |

FOREIGN PATENT DOCUMENTS

| | | |
|---|---|---|
| EP | 1 908 798 A1 | 4/2008 |
| EP | 2 009 034 A2 | 12/2008 |
| EP | 2 033 992 A2 | 3/2009 |
| GB | 1100569 | 1/1968 |
| JP | 58-185604 A | 10/1983 |
| JP | 2-232219 A | 9/1990 |
| JP | 2002-138245 A | 5/2002 |
| JP | 2004-250505 A | 9/2004 |
| RU | 2 076 109 C1 | 3/1997 |
| RU | 2 133 756 C1 | 7/1999 |
| SU | 653266 A1 | 3/1979 |
| WO | WO 94/26789 A1 | 11/1994 |
| WO | WO 00/49072 A1 | 8/2000 |
| WO | WO 01/23471 A1 | 4/2001 |
| WO | WO 02/064691 A2 | 8/2002 |
| WO | WO 2004/090020 A1 | 10/2004 |
| WO | WO 2005/080517 A1 | 9/2005 |
| WO | WO 2006/045017 A1 | 4/2006 |
| WO | WO 2007/123659 A1 | 11/2007 |
| WO | WO 2007/138111 A1 | 12/2007 |
| WO | WO 2008/036629 A2 | 3/2008 |
| WO | WO 2009/137014 A1 | 11/2009 |
| WO | WO 2010/019180 A1 | 2/2010 |
| WO | WO 2010/062844 A1 | 6/2010 |
| WO | WO 2010/097353 A1 | 9/2010 |
| WO | WO 2010/100121 A1 | 9/2010 |
| WO | WO 2010/100122 A1 | 9/2010 |
| WO | WO 2010/114648 A1 | 10/2010 |
| WO | WO 2011/009024 A1 | 1/2011 |
| WO | WO 2011/011705 A2 | 1/2011 |
| WO | WO 2011/011707 A2 | 1/2011 |

OTHER PUBLICATIONS

International Search Report and Written Opinion dated Jun. 15, 2010 for International Application No. PCT/EP2010/052174.
International Preliminary Report on Patentability dated May 30, 2011 for International Application No. PCT/EP2010/052174.
Diehl et al., "Waterborne Mechanical Dispersions of Polyolefins," The Dow Chemical Company, Jan. 24, 2009, pp. 1-14.
Men'Shikova et al., "Synthesis of Carboxylated Monodisperse Latexes and Their Self-Organization in Thin Films," Russian J. of Applied Chem, vol. 78, No. 1 (2005) pp. 159-165.
Mishra et al., "Synthesis and Characterization of . . . Methacrylate Latexes," J. of Applied Polymer Science, vol. 115 (2010) pp. 549-557.
Norakankorn et al., "Synthesis of core/shell structure of glycidyl-funtionalized . . . via different microemulsion polymerization," European Polymer J. 45 (2009) pp. 2977-2986.
English language translation for German Patent Application No. DE 102 25 367 C1 (publication date Sep. 18, 2003).
English language translation for Japanese Laid-open Publication No. 53-39387 (publication date Apr. 11, 1978).
English translation of Chinese office action dated Feb. 7, 2013 for Chinese Application No. CN 201080008007.8.
Abstract of JP 58-185604 A (publication date Oct. 29, 1983).
Abstract of JP 2-232219 A (publication date Sep. 14, 1990).
English language machine translation of JP 2002-138245 A (publication date May 14, 2002).
Abstract of JP 2004-250505 A (publication date Sep. 9, 2004).
Russian Office Action dated Feb. 21, 2014 for related Application No. 2011138153.
English translation of SU 653266 A1 (publication dated Mar. 25, 1979).
Polystep® B-1, Stepan Company, retrieved from http://www.stepan.com/products/Surfactants/POLYSTEP%C2%AE/POLYSTEP%C2%AE-B-1.aspx, © 2012.
Stepan, Emulsion Polymerization, Product Bulletin, Nov. 2009.
Polymerizable Surfactants, Montello Inc., retrieved on Feb. 4, 2015, http://www.montelloinc.com/polymerizable_surfactants2.htm.

LATEX EMULSIONS AND COATING COMPOSITIONS FORMED FROM LATEX EMULSIONS

This application is a continuation of U.S. application Ser. No. 13/147,310 filed on Aug. 1, 2011, which is the national phase application of International Application No. PCT/EP2010/052174 filed on Feb. 22, 2010, which claims the benefit of U.S. Provisional Application No. 61/154,924 filed on Feb. 24, 2009 and European Application No. 09155735.5 filed on Mar. 20, 2009, the contents of each of which are incorporated herein by reference.

BACKGROUND OF THE INVENTION

1. Field of the Invention

The present invention relates to latex emulsions, coating compositions formed from latex emulsions, methods of coating substrates with coating compositions, and substrates coated with coating compositions.

2. Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable.

International Publication No. WO 2008/036629 discloses a coating composition for food and beverage containers composed of a grafted polyester-acrylate resin that is crosslinked with a phenolic crosslinker and catalyzed by a titanium-containing or zirconium-containing catalyst.

U.S. Patent Application Publication No. 2005/0196629 also discloses a coating composition for food and beverage containers composed of a grafted polyester-acrylate resin that is crosslinked with a phenolic crosslinker.

U.S. Patent Application Publication No. 2006/0100366 uses an acrylic polymer as a dispersant for latex polymerization by combining an ethylenically unsaturated monomer component with a dispersion of a salt of an acid- or anhydride-functional polymer and an amine to form an emulsion.

U.S. Patent Application Publication No. 2007/0117928 and U.S. Pat. No. 7,189,787 disclose the formation of a dispersion which is the reaction product of a tertiary amine with an acid functional polymer and a glycidyl functional polymer.

International Publication No. WO 2007/123659 discloses a coating composition formed by crosslinking an acrylic polymer having a molecular weight greater than 41,000 and an acid value less than 30 mg KOH/g.

U.S. Patent Application Publication No. 2007/0281179 discloses a coating composition having a polyester which is the reaction product of a polyol and a bis-epoxy reacted with a mono- and/or di-phenolic carboxylic acid and/or ester.

Latexes made by emulsion polymerization have not achieved the performance of epoxy based coatings and have not been successfully used on a commercial basis in food and beverage coating compositions. Some drawbacks have been flavor acceptance in beer and blush performance in pasteurized or retorted hard-to-hold beverages. Typical latex emulsion polymers use sodium salts as buffers and stabilizers, and/or non ionic surfactants which also impart an unacceptable degree of sensitivity to water (blushing).

There is a need to produce coating compositions that do not contain bisphenol A or are substantially free of bisphenol A. The latex emulsions of the invention can be used in the preparation of coating compositions suitable, inter alia, as packaging coatings for food and beverage packaging and containers.

SUMMARY OF THE INVENTION

The present invention provides an alternate to epoxy resins that still allows formaldehyde free cure, blush resistance, capability to retort and can withstand hard-to-hold beverages. The coating compositions of the invention can be made with a simple process, not requiring multiple polymers or processing stages to achieve the intended effect.

The present invention includes methods for preparing latex emulsions. In some embodiments of the invention, a latex emulsion is prepared by a method comprising the steps of mixing an ethylenically unsaturated monomer component and a stabilizer comprising a strong acid, in a carrier to form a monomer emulsion, and reacting the monomer emulsion with an initiator to form the latex emulsion, wherein the stabilizer is present in an amount from about 0.1% to about 2.0% by weight polymeric solids.

In some embodiments of the invention, a latex emulsion is used in the formation of a coating composition for food and beverage packaging and containers. In some embodiments, the coating compositions are prepared by a method comprising the steps of preparing a latex emulsion by a method comprising the steps of mixing an ethylenically unsaturated monomer component and a stabilizer comprising a strong acid, in a carrier to form a monomer emulsion, reacting the monomer emulsion with an initiator to form the latex emulsion, and reacting the latex emulsion with a neutralizer to form the coating composition, wherein the stabilizer is present in an amount from about 0.1% to about 2.0% by weight polymeric solids. The coating compositions exhibit no or minimal blush, no or minimal color pick-up, and commercially acceptable adhesion.

In some embodiments of the invention, a method of coating a substrate is disclosed comprising the steps of preparing a latex emulsion by a method comprising the steps of mixing an ethylenically unsaturated monomer component and a stabilizer comprising a strong acid, in a carrier to form a monomer emulsion, reacting the monomer emulsion with an initiator to form the latex emulsion, reacting the latex emulsion with a neutralizer to form a coating composition, and applying the coating composition to the substrate. In some embodiments, the stabilizer is present in an amount from about 0.1% to about 2.0% by weight polymeric solids. In some embodiments, the substrate is a can or packaging.

Substrates coated with the coating compositions of the invention are also disclosed. In some embodiments, the substrate is a can or packaging.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

Other than in the operating examples, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Unless stated otherwise, all percentages, ratios and proportions herein are by weight and particularly unless otherwise specifically stated, the proportions of the components in the compositions described are given in percentage pertaining to the total mass of the mixture of these components.

Also herein, the recitations of numerical ranges by endpoints include all numbers subsumed within that range (e.g., 1 to 5 includes 1, 1.5, 2, 2.75, 3, 3.80, 4, 5, etc.).

Also herein, "a," "an," "the", "at least one", and "one or more" are used interchangeably.

Also herein, the term "comprises" and variations thereof do not have a limiting meaning where these terms appear in the description and claims.

The terms "for example", "without limitation" and the like, as well as the exemplary compounds, ranges, parameters and the like disclosed throughout the application and claims are intended to identify embodiments of the invention in a non-limiting manner. Other compounds, ranges, parameters and the like can be employed by those skilled in the art without departing from the spirit and scope of the invention.

The present invention includes substrates coated at least in part with a coating composition of the invention and methods for coating the substrates. The term "substrate" as used herein includes, without limitation, cans, metal cans, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

The present invention includes methods for preparing a latex emulsion by mixing an ethylenically unsaturated monomer component and a stabilizer comprising a strong acid, in a carrier to form a monomer emulsion, and reacting the monomer emulsion with an initiator to form the latex emulsion, wherein the stabilizer is present in an amount of about 0.1% to about 2.0% by weight polymeric solids. In some embodiments, the latex emulsion is reacted with a neutralizer to form a coating composition for food and beverage packaging and containers. The latex emulsions can be used in the preparation of coating compositions suitable, inter alia, as packaging coatings for food and beverage packaging and containers.

The latex emulsions used in the present invention are prepared in some embodiments by techniques known in the art, such as without limitation, suspension polymerization, interfacial polymerization, and emulsion polymerization. Emulsion polymerization techniques for preparing latex emulsions from ethylenically unsaturated monomer components are well known in the polymer arts, and any conventional latex emulsion technique can be used, such as for non-limiting example, single and multiple shot batch processes, and continuous processes. If desired, an ethylenically unsaturated monomer component mixture can be prepared and added gradually to the polymerization vessel. The ethylenically unsaturated monomer component composition within the polymerization vessel may be varied during the course of the polymerization, such as, for non-limiting example, by altering the composition of the ethylenically unsaturated monomer component being fed into the vessel. Both single and multiple stage polymerization techniques can be used in some embodiments of the invention. In some embodiments, the latex emulsions are prepared using a seed polymer emulsion to control the number of particles produced by emulsion polymerization as known in the art. The particle size of the latex polymer particles is controlled in some embodiments by adjusting the initial surfactant charge.

The ethylenically unsaturated monomer component can be composed of a single monomer or a mixture of monomers in various embodiments. In some embodiments, the ethylenically unsaturated monomer component is present in an amount from about 2% to about 50% based on total mixture. The ethylenically unsaturated monomer component includes, without limitation, one or more vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include without limitation, methyl vinyl ether, isopropyl vinyl ether, n-butyl vinyl ether, and isobutyl vinyl ether. Acrylic monomers include without limitation, monomers such as for non-limiting example, lower alkyl esters of acrylic or methacrylic acid having an alkyl ester portion other than methyl or ethyl containing between about 3 to about 10 carbon atoms, as well as aromatic derivatives of acrylic and methacrylic acid. Acrylic monomers also include, for non-limiting example, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, and amino acrylates and methacrylates.

In some embodiments, the ethylenically unsaturated monomer component includes at least one multi-ethylenically unsaturated monomer component effective to raise the molecular weight and crosslink the polymer. Non-limiting examples of multi-ethylenically unsaturated monomer components include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol (meth)acrylate, polyalkylene glycol di(meth)acrylate, diallyl phthalate, trimethylolpropane tri (meth)acrylate, divinylbenzene, divinyltoluene, trivinylbenzene, divinylnaphthalene, and mixtures thereof. In some embodiments, the multi-ethylenically unsaturated monomer component is present in an amount from about 0.1 to about 5%.

In some embodiments of the invention, the ethylenically unsaturated monomer component is mixed with a stabilizer comprising a strong acid, in a carrier to form a monomer emulsion. Optionally, a base is present in the mixture. In some embodiments, the stabilizer is present in an amount from about 0.1% to 2.0% by weight polymeric solids.

Non-limiting examples of stabilizers include strong acids, such as without limitation, dodecylbenzene sulfonic acid, dinonylnaphthalene sulfonic acid, dinonylnaphthylenedisulfonic acid, bis(2-ethylhexyl)sulfosuccinic acid and the like, including mixtures thereof. In some embodiments, a strong acid is an acid with a dissociation constant in aqueous solution, pK less than about 4. In some embodiments, the strong acid has a hydrophobe attached to the acid. In some embodiments, the strong acid has at least about six carbon atoms.

Non-limiting examples of a base include ammonia, dimethylethanolamine, 2-dimethylamino-2-methyl-1-propanol, and mixtures thereof. In some embodiments, the base is present in an amount of about 50% to 100% mole to mole of stabilizer.

In some embodiments, the carrier includes, without limitation, water, a water soluble cosolvent, and mixtures thereof. The carrier is present in an amount of about 50 to about 90% of the total latex emulsion in some embodiments.

In some embodiments of the invention, the monomer emulsion is reacted with one or more initiators to form a latex emulsion. The initiator includes, for non-limiting example, initiators which thermally decompose at the polymerization temperature to generate free radicals. Examples of initiators include, without limitation, both water-soluble and water-insoluble species. Examples of free radical-generating initiators include, for non-limiting example, persulfates, such as without limitation, ammonium or alkali metal (potassium, sodium or lithium) persulfate, azo compounds such as without limitation, 2,2'-azo-bis(isobutyronitrile), 2,2'-azo-bis(2,4-dimethylvaleronitrile), and 1-t-butyl-azocyanocyclohexane), hydroperoxides such as without limitation, t-butyl hydroperoxide and cumene hydroperoxide, peroxides such as without limitation, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate, peresters such as without limitation, t-butyl peracetate, t-butyl perphthalate, and t-butyl perbenzoate, percarbonates, such as without limitation, di(1-cyano-1-methylethyl)peroxy dicarbonate, perphosphates, and the like.

In some embodiments, the initiator is used alone or as the oxidizing component of a redox system, which includes, without limitation, a reducing component such as, for non-limiting example, ascorbic acid, malic acid, glycolic acid, oxalic acid, lactic acid, thiogycolic acid, or an alkali metal sulfite, such as without limitation, a hydrosulfite, hyposulfite or metabisulfite, such as without limitation, sodium hydrosulfite, potassium hyposulfite and potassium metabisulfite, or sodium formaldehyde sulfoxylate. The reducing component can be referred to as an accelerator or a catalyst activator.

The initiator and accelerator, which can be referred to as an initiator system, are each employed in some embodiments in proportion from about 0.001% to about 5%, based on the weight of ethylenically unsaturated monomer component to be copolymerized. Promoters such as without limitation, chloride and sulfate salts of cobalt, iron, nickel or copper are optionally employed in amounts from about 2 to about 200 parts per million in some embodiments. Non-limiting example of redox catalyst systems include, without limitation, tert-butyl hydroperoxide/sodium formaldehyde sulfoxylate/Fe(II), and ammonium persulfate/sodium bisulfite/ sodium hydrosulfite/Fe(II), and combinations thereof. In some embodiments, the polymerization temperature is from about room temperature to about 90° C., and the temperature can be optimized for the initiator system employed, as is conventional.

In some embodiments of the invention, aggregation of polymeric latex particles is limited by including a stabilizing surfactant during polymerization. For non-limiting example, the growing latex particles are stabilized during emulsion polymerization by one or more surfactants such as, without limitation, dodecylbenzene sulfonic acid, an anionic or nonionic surfactant, or a mixture thereof, as is well known in the polymerization art. Other types of stabilizing agents, such as, without limitation, protective colloids, can be used in some embodiments. Generally speaking, conventional anionic surfactants with metal, nonionic surfactants containing polyethylene chains and other protective colloids tend to impart water sensitivity to the resulting films. In some embodiments of the invention, it is desirable to minimize or avoid the use of these conventional anionic and nonionic surfactants. In some embodiments, the stabilizing surfactant is employed during seed polymerization.

Chain transfer agents are used in some embodiments of the invention to control the molecular weight of the latex emulsion. Non-limiting examples of chain transfer agents include mercaptans, polymercaptans, polyhalogen compounds, alkyl mercaptans such as without limitation, ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan, mercapto carboxylic acids and their esters, such as without limitation, methyl mercaptopropionate and 3-mercaptopropionic acid, alcohols such as without limitation, isopropanol, isobutanol, lauryl alcohol and t-octyl alcohol, halogenated compounds such as without limitation, carbon tetrachloride, tetrachloroethylene, tricholoro-bromoethane, and combinations thereof. In some embodiments, from about 0 to about 10% by weight, based on the weight of the ethylenically unsaturated monomer component mixture is employed. The latex emulsion molecular weight is controlled in some embodiments by techniques known in the art, such as without limitation, by selecting the ratio of initiator to ethylenically unsaturated monomer component.

In some embodiments, the initiator system and/or chain transfer agent is dissolved or dispersed in separate fluid mediums or in the same fluid medium, and then gradually added to the polymerization vessel. In some embodiments, the ethylenically unsaturated monomer component, either neat or dissolved or dispersed in a fluid medium, is added simultaneously with the catalyst and/or the chain transfer agent. The catalyst is added to the polymerization mixture to "chase" residual monomer after polymerization has been substantially completed to polymerize the residual monomer as is well known in the polymerization arts.

In some embodiments, an additional monomer mixture of an ethylenically unsaturated monomer component and a stabilizer is added to the monomer emulsion. Optionally, a base is present in the additional monomer mixture. The additional monomer mixture can be added to the monomer emulsion in some embodiments prior to addition of the initiator, after addition of the initiator, or both before and after addition of the initiator. The compositions of the ethylenically unsaturated monomer component, stabilizer and base in the additional monomer mixture can be the same as or different than the compositions of these components in the monomer emulsion.

The latex emulsion is reacted with a neutralizer in some embodiments of the invention to form a coating composition. In some embodiments, the reaction occurs in the presence of a solvent. For non-limiting example, the solvent includes a ketone, an aromatic solvent, an ester solvent, a hydroxyl functional solvent, or a mixture thereof. In some embodiments, the solvent is present in an amount from about 0% to about 90% by weight polymeric solids.

In some embodiments, the neutralizer includes, without limitation, ammonia, a tertiary amine, such as, for non-limiting example, dimethylethanolamine, 2-dimethylamino-2-methyl-1-propanol, tributylamine, or a mixture thereof. For non-limiting example, the neutralizer is employed in an amount from about 0% to about 100% based on of the amount of acid to be neutralized in the system.

The latex emulsions and the coating compositions of the invention can include conventional additives known to those skilled in the art, such as without limitation, additives to control foam, reduce equilibrium and dynamic surface tension, control rheology and surface lubricity. Amounts can vary depending on desired coating application and performance in any manner known to those skilled in the art.

One or more coating compositions of the invention are applied to a substrate in some embodiments, such as for non-limiting example, cans, metal cans, packaging, containers, receptacles, can ends, or any portions thereof used to hold or touch any type of food or beverage. In some embodiments, one or more coatings are applied in addition to the coating composition of the present invention, such as for non-limiting example, a prime coat may be applied between the substrate and a coating composition of the present invention.

The coating compositions can be applied to substrates in any manner known to those skilled in the art. In some embodiments, the coating compositions are sprayed onto a substrate. When spraying, the coating composition contains, for non-limiting example, between about 10% and about 30% by weight polymeric solids relative to about 70% to about 90% water including other volatiles such as, without limitation, minimal amounts of solvents, if desired. For some applications, typically those other than spraying, the aqueous polymeric dispersions can contain, for non-limiting example, between about 20% and about 60% by weight polymer solids. Organic solvents are utilized in some embodiments to facilitate spray or other application methods and such solvents include, without limitation, n-butanol, 2-butoxy-ethanol-1, xylene, toluene, and mixtures thereof. In some embodiments, n-butanol is used in combination with 2-butoxy-ethanol-1. The coating compositions of the present invention are pigmented and/or opacified with known pigments and opacifiers in some embodiments. For many uses, including food use for non-limiting example, the pigment is titanium dioxide. The resulting aqueous coating composition is applied in some embodiments by conventional methods known in the coating industry. Thus, for non-limiting example, spraying, rolling, dipping, and flow coating application methods can be used for both clear and pigmented films. In some embodiments, after application onto a substrate, the coating is cured thermally at temperatures in the range from about 130° C. to about 250° C., and alternatively higher for time sufficient to effect complete curing as well as volatilizing of any fugitive component therein.

For substrates intended as beverage containers, the coating are applied in some embodiments at a rate in the range from about 0.5 to about 15 milligrams of polymer coating per square inch of exposed substrate surface. In some embodiments, the water-dispersible coating is applied at a thickness between about 1 and about 25 microns

EXAMPLES

The invention will be further described by reference to the following non-limiting examples. It should be understood that variations and modifications of these examples can be made by those skilled in the art without departing from the spirit and scope of the invention.

Example 1

To 2697.12 g demineralized water was added a mixture of 2.01 g of 70% dodecylbenzene sulfonic acid in iPrOH, 9.4 g demineralized water and 0.28 g 28% ammonia. The mixture was heated to 80° C. under a nitrogen sparge. When temperature was reached, the sparge was replaced with a nitrogen blanket. 93.98 g of a monomer mixture with composition; 18% styrene, 13% methacrylic acid, 51.25% butyl acrylate, 5.75% glycidyl methacrylate and 12% hydroxypropyl methacrylate was added and mixed for 15 min. Then, a mixture of 36.14 g demineralized water and 4.70 g ammonium persulfate was added and held for 15 min. Following the hold, 845.78 g of a monomer mixture identical to the one above was fed in over 180 min. Additionally, a co-feed consisting of 140.96 g demineralized water, 2.01 g of 70% dodecylbenzene sulfonic acid in iPrOH and 0.28 g 28% ammonia was fed in over 180 min. Upon completion of the feeds, a mixture of 84.58 g demineralized water, 0.94 g ascorbic acid and 0.001 g iron (II) sulfate was added followed by a mixture of 9.4 g demineralized water and 2.35 g t-butyl perbenzoate. The reaction was held for 15 minutes and then a mixture of 23.35 g demineralized water and 46.72 g dimethylethanolamine was added and held for 60 min then cooled.

To 2500 g of the above latex was added a mixture of 359.6 g butanol, 88.1 g 2-butoxyethanol, 7.5 g 2-hexoxyethanol and 5.9 g Surfynol 420. Then, 113.2 g demineralized water was added and mixed for 30 min.

Example 2

To 2319.04 g demineralized water was added a mixture of 1.72 g of 70% dodecylbenzene sulfonic acid in iPrOH, 8.02 g demineralized water and 0.24 g 28% ammonia. The mixture was heated to 80° C. under a nitrogen sparge. When temperature was reached, the sparge was replaced with a nitrogen blanket. 80.16 g of a monomer mixture with composition; 60% styrene, 12% methacrylic acid, 8% butyl acrylate, 12% glycidyl methacrylate and 8% hydroxypropyl methacrylate was added and mixed for 15 min. Then, a mixture of 30.84 g demineralized water and 4.01 g ammonium persulfate was added and held for 15 min. Following the hold, 721.58 g of a monomer mixture identical to the one above was fed in over 180 min. Additionally, a co-feed consisting of 120.26 g demineralized water, 1.72 g of 70% dodecylbenzene sulfonic acid in iPrOH and 0.24 g 28% ammonia was fed in over 180 min. Upon completion of the feeds, a mixture of 72.16 g demineralized water, 0.80 g ascorbic acid and 0.001 g iron (II) sulfate was added followed by a mixture of 8.02 g demineralized water and 2.0 g t-butyl perbenzoate. The reaction was held for 15 minutes and then a mixture of 49.81 g demineralized water and 49.81 g dimethylethanolamine was added and held for 60 min. Then, a mixture of 200.44 g butanol, 200.44 g 2-butoxyethanol and 200.44 g Dowanol PnB was added and held 60 min. The mixture was cooled and 120.26 g demineralized water and 8.02 g Surfynol 420 was added and mixed for 15 min.

Example 3

To 2283.95 g demineralized water was added a mixture of 1.70 g of 70% dodecylbenzene sulfonic acid in iPrOH, 7.96 g demineralized water and 0.24 g 28% ammonia. The mixture was heated to 80° C. under a nitrogen sparge. When temperature was reached, the sparge was replaced with a nitrogen blanket. 79.58 g of a monomer mixture with composition outlined in Table 1 below was added and mixed for 15 min (Example 3 was performed five times respectively using the monomer mixture Samples A, B, C, D, then E shown in Table 1). Then, a mixture of 30.61 g demineralized water and 3.98 g ammonium persulfate was added and held for 15 min. Following the hold, 716.22 g of a monomer mixture identical to the one above was fed in over 180 min. Additionally, a co-feed consisting of 119.37 g demineralized water, 1.70 g of 70% dodecylbenzene sulfonic acid in iPrOH and 0.24 g 28% ammonia was fed in over 180 min. Upon completion of the feeds, a mixture of 71.62 g demineralized water, 0.80 g ascorbic acid and 0.001 g iron (II) sulfate was added followed by a mixture of 7.96 g demineralized water and 1.99 g t-butyl perbenzoate. The reaction was held for 15 minutes and then a mixture of 29.66 g demineralized water and 29.66 g dimethylethanolamine was added and held for 60 min. Then, a mixture of 119.37 g butanol, 119.37 g 2-butoxyethanol and 119.37 g Dowanol PnB was added and held 60 min. The mixture was cooled and 246.7 g demineralized water and 7.96 g Surfynol 420 was added and mixed for 15 min. Then, a mixture of 79.6 g butanol, 79.6 g 2-butoxyethanol and 79.6 g Dowanol PnB was added. Then, a mixture of dimethylethanolamine and demineralized water as outlined in Table 2 below and mixed for 30 min (Example 3 was performed five times respectively using the dimethylethanolamine and water mixture Samples A, B, C, D, then E shown in Table 1).

TABLE 1

Monomer levels in Example 3.

| Sample | % Styrene | % MAA | % BA | % GMA | % HPMA |
|---|---|---|---|---|---|
| A | 65 | 9 | 19 | 3 | 4 |
| B | 67 | 6 | 18 | 1 | 8 |
| C | 35 | 10.5 | 45.5 | 3 | 6 |
| D | 0 | 10.5 | 79.5 | 10 | 0 |
| E | 21 | 12 | 54 | 5 | 0 |

TABLE 2

Amount of Amine and Water in Example 3.

| Sample | g DMEA | g Water |
|---|---|---|
| A | 12.5 | 12.5 |
| B | 30.0 | 30.0 |
| C | 15.0 | 15.0 |
| D | 20.0 | 20.0 |
| E | 40.0 | 40.0 |

Example 4

To 2561.20 g demineralized water was added a mixture of 1.91 g of 70% dodecylbenzene sulfonic acid in iPrOH, 8.92 g demineralized water and 0.27 g 28% ammonia. The mixture was heated to 80° C. under a nitrogen sparge. When temperature was reached, the sparge was replaced with a nitrogen blanket. 89.24 g of a monomer mixture with composition; 70% styrene, 12% methacrylic acid, 8% butyl acrylate, 2% butanediol dimethacrylate and 8% hydroxypropyl methacrylate was added and mixed for 15 min. Then, a mixture of 34.32 g demineralized water and 4.46 g ammonium persulfate was added and held for 15 min. Following the hold, 803.15 g of a monomer mixture identical to the one above was fed in over 180 min. Additionally, a co-feed consisting of 133.86 g demineralized water, 1.91 g of 70% dodecylbenzene sulfonic acid in iPrOH and 0.27 g 28% ammonia was fed in over 180 min. Upon completion of the feeds, a mixture of 80.31 g demineralized water, 0.89 g ascorbic acid and 0.001 g iron (II) sulfate was added followed by a mixture of 8.92 g demineralized water and 2.23 g t-butyl perbenzoate. The reaction was held for 15 minutes and then a mixture of 33.26 g demineralized water and 33.26 g dimethylethanolamine was added and held for 60 min. Then, a mixture of 133.86 g butanol, 133.86 g 2-butoxyethanol and 133.86 g Dowanol PnB was added and held 60 min. The mixture was cooled and then a mixture of 90.33 g butanol, 90.33 g 2-butoxyethanol and 90.33 g Dowanol PnB was added. Then, a mixture of 7.5 g dimethylethanolamine in 7.5 g demineralized water was added and mixed 30 min.

Example 5

To 2561.20 g demineralized water was added a mixture of 1.91 g of 70% dodecylbenzene sulfonic acid in iPrOH, 8.92 g demineralized water and 0.27 g 28% ammonia. The mixture was heated to 80° C. under a nitrogen sparge. When temperature was reached, the sparge was replaced with a nitrogen blanket. 89.24 g of a monomer mixture with composition; 70% styrene, 12% methacrylic acid, 8% butyl acrylate, 2% ethyleneglycol dimethacrylate and 8% hydroxypropyl methacrylate was added and mixed for 15 min. Then, a mixture of 34.32 g demineralized water and 4.46 g ammonium persulfate was added and held for 15 min. Following the hold, 803.15 g of a monomer mixture identical to the one above was fed in over 180 min. Additionally, a co-feed consisting of 133.86 g demineralized water, 1.91 g of 70% dodecylbenzene sulfonic acid in iPrOH and 0.27 g 28% ammonia was fed in over 180 min. Upon completion of the feeds, a mixture of 80.31 g demineralized water, 0.89 g ascorbic acid and 0.001 g iron (II) sulfate was added followed by a mixture of 8.92 g demineralized water and 2.23 g t-butyl perbenzoate. The reaction was held for 15 minutes and then a mixture of 33.26 g demineralized water and 33.26 g dimethylethanolamine was added and held for 60 min. Then, a mixture of 133.86 g butanol, 133.86 g 2-butoxyethanol and 133.86 g Dowanol PnB was added and held 60 min. The mixture was cooled and then a mixture of 90.33 g butanol, 90.33 g 2-butoxyethanol and 90.33 g Dowanol PnB was added. Then, a mixture of 5.0 g dimethylethanolamine in 5.0 g demineralized water was added and mixed 30 min.

Example 6

To 2288.50 g demineralized water was added a mixture of 1.71 g of 70% dodecylbenzene sulfonic acid in iPrOH, 7.97 g demineralized water and 0.24 g 28% ammonia. The mixture was heated to 80° C. under a nitrogen sparge. When temperature was reached, the sparge was replaced with a nitrogen blanket. 79.74 g of a monomer mixture with composition; 62.1% styrene, 12% methacrylic acid, 15.9% ethyl acrylate, 2% butanediol dimethacrylate and 8% hydroxypropyl methacrylate was added and mixed for 15 min. Then, a mixture of 30.67 g demineralized water and 3.99 g ammonium persulfate was added and held for 15 min. Following the hold, 717.65 g of a monomer mixture identical to the one above was fed in over 180 min. Additionally, a co-feed consisting of 119.61 g demineralized water, 1.71 g of 70% dodecylbenzene sulfonic acid in iPrOH and 0.24 g 28% ammonia was fed in over 180 min. Upon completion of the feeds, a mixture of 71.76 g demineralized water, 0.80 g ascorbic acid and 0.001 g iron (II) sulfate was added followed by a mixture of 7.97 g demineralized water and 1.99 g t-butyl perbenzoate. The reaction was held for 15 minutes and then a mixture of 29.72 g demineralized water and 29.72 g dimethylethanolamine was added and held for 60 min. Then, a mixture of 119.61 g butanol, 119.61 g 2-butoxyethanol and 119.61 g Dowanol PnB was added and held 60 min. The mixture was cooled and 247.19 g demineralized water added followed by a mixture of 80.63 g butanol, 80.63 g 2-butoxyethanol and 80.63 g Dowanol PnB was added. Then, a mixture of 11.5 g dimethylethanolamine in 11.5 g demineralized water was added and mixed 30 min.

Example 7

To 2288.50 g demineralized water was added a mixture of 1.71 g of 70% dodecylbenzene sulfonic acid in iPrOH, 7.97 g demineralized water and 0.24 g 28% ammonia. The mixture was heated to 80° C. under a nitrogen sparge. When temperature was reached, the sparge was replaced with a nitrogen blanket. 79.74 g of a monomer mixture with composition; 68.5% styrene, 12% methacrylic acid, 9.5% 2-ethylhexyl acrylate, 2% butanediol dimethacrylate and 8% hydroxypropyl methacrylate was added and mixed for 15 min. Then, a mixture of 30.67 g demineralized water and 3.99 g ammonium persulfate was added and held for 15 min. Following the hold, 717.65 g of a monomer mixture identical to the one above was fed in over 180 min. Additionally, a co-feed consisting of 119.61 g demineralized water, 1.71 g of 70% dodecylbenzene sulfonic acid in iPrOH and 0.24 g 28% ammonia was fed in over 180 min. Upon completion of the feeds, a mixture of 71.76 g demineralized water, 0.80 g ascorbic acid and 0.001 g iron (II) sulfate was added followed by a mixture of 7.97 g demineralized water and 1.99 g t-butyl perbenzoate. The reaction was held for 15 minutes and then a mixture of 29.72 g demineralized water and 29.72 g dimethylethanolamine was added and held for 60 min. Then, a mixture of 119.61 g butanol, 119.61 g 2-butoxyethanol and 119.61 g Dowanol PnB was added and held 60 min. The mixture was cooled and 247.19 g demineralized water added followed by a mixture of 80.63 g butanol, 80.63 g 2-butoxyethanol and 80.63 g Dowanol PnB was added. Then, a mixture of 18.8 g dimethylethanolamine in 18.8 g demineralized water was added and mixed 30 min.

Example 8

To 2288.50 g demineralized water was added a mixture of 1.71 g of 70% dodecylbenzene sulfonic acid in iPrOH, 7.97 g demineralized water and 0.24 g 28% ammonia. The mixture was heated to 80° C. under a nitrogen sparge. When temperature was reached, the sparge was replaced with a nitrogen blanket. 79.74 g of a monomer mixture with composition; 65.5% methyl methacrylate, 12% methacrylic acid, 12.5% butyl acrylate, 2% butanediol dimethacrylate and 8% hydroxypropyl methacrylate was added and mixed for 15 min. Then, a mixture of 30.67 g demineralized water and 3.99 g ammonium persulfate was added and held for 15 min. Following the hold, 717.65 g of a monomer mixture identical to the one above was fed in over 180 min. Additionally, a co-feed consisting of 119.61 g demineralized water, 1.71 g of 70% dodecylbenzene sulfonic acid in iPrOH and 0.24 g 28% ammonia was fed in over 180 min. Upon completion of the feeds, a mixture of 71.76 g demineralized water, 0.80 g ascorbic acid and 0.001 g iron (II) sulfate was added followed by a mixture of 7.97 g demineralized water and 1.99 g t-butyl perbenzoate. The reaction was held for 15 minutes and then a mixture of 39.6 g demineralized water and 39.6 g dimethylethanolamine was added and held for 60 min. Then, a mixture of 119.61 g butanol, 119.61 g 2-butoxyethanol and 119.61 g Dowanol PnB was added and held 60 min. The mixture was cooled and 257.07 g demineralized water added followed by a mixture of 80.63 g butanol, 80.63 g 2-butoxyethanol and 80.63 g Dowanol PnB was added. Then, 120 g demineralized water was added and mixed 30 min.

Example 9

To 2283.95 g demineralized water was added a mixture of 1.70 g of 70% dodecylbenzene sulfonic acid in iPrOH, 7.96 g demineralized water and 0.24 g 28% ammonia. The mixture was heated to 80° C. under a nitrogen sparge. When temperature was reached, the sparge was replaced with a nitrogen blanket. 79.59 g of a monomer mixture with composition; 14.15% styrene, 12% methacrylic acid, 65.35% butyl methacrylate, 0.5% glycidyl methacrylate and 8% hydroxypropyl methacrylate was added and mixed for 15 min. Then, a mixture of 30.61 g demineralized water and 3.98 g ammonium persulfate was added and held for 15 min. Following the hold, 716.23 g of a monomer mixture identical to the one above was fed in over 180 min. Additionally, a co-feed consisting of 119.37 g demineralized water, 1.70 g of 70% dodecylbenzene sulfonic acid in iPrOH and 0.24 g 28% ammonia was fed in over 180 min. Upon completion of the feeds, a mixture of 71.62 g demineralized water, 0.80 g ascorbic acid and 0.001 g iron (II) sulfate was added followed by a mixture of 7.96 g demineralized water and 1.99 g t-butyl perbenzoate. The reaction was held for 15 minutes and then a mixture of 29.66 g demineralized water and 29.66 g dimethylethanolamine was added and held for 60 min. Then, a mixture of 119.37 g butanol, 119.37 g 2-butoxyethanol and 119.37 g Dowanol PnB was added and held 60 min. The mixture was cooled and 246.70 g demineralized water added followed by a mixture of 80.63 g butanol, 80.63 g 2-butoxyethanol and 80.63 g Dowanol PnB was added. Then, a mixture of 9.0 g dimethylethanolamine in 9.0 g demineralized water was added and mixed 30 min.

Example 10

Compositions from Examples 1-9 above were sprayed onto two-piece beverage cans and evaluated for performance. Spray: cans with 125 mg/can film weight evaluated via enamel rater.
Cans filled with Gatorade and retorted for 60 min at 250° F. were visually evaluated for blush and color pick-up, and adhesion was evaluated according to the specified test method.
  Blush: 0=no whitening, 5=opaque white
  Color: 0=no color, 5=color of Gatorade
  Adhesion: % crosshatch removed with tape (Test Method: DIN ES ISO 2409)

| Example | Spray (mA) | Blush | Color | Adhesion |
| --- | --- | --- | --- | --- |
| 1 | 2.8 | 0 | 0 | 0 |
| 2 | 2.7 | 0 | 0 | 0 |
| 3A | 4.3 | 0 | 1 | 0 |
| 3B | 4.3 | 0 | 0 | 0 |
| 3C | 1.9 | 0 | 0 | 0 |
| 3D | 43.1 | 0 | 0 | 0 |
| 3E | 5.0 | 0 | 0 | 0 |
| 4 | 5.5 | 0 | 1 | 0 |

| Example | Spray (mA) | Blush | Color | Adhesion |
|---------|------------|-------|-------|----------|
| 5 | 15.4 | 0 | 1 | 0 |
| 6 | 5.6 | 0 | 0 | 0 |
| 7 | 33.0 | 0 | 0 | 0 |
| 8 | 72.0 | 0 | 1 | 0 |
| 9 | 3.9 | 0 | 0 | 0 |

Example 11

To 2339.13 g demineralized water was added a mixture of 1.73 g of 70% dodecylbenzene sulfonic acid in iPrOH, 8.09 g demineralized water and 0.24 g 28% ammonia. The mixture was heated to 80° C. under a nitrogen sparge. When temperature was reached, the sparge was replaced with a nitrogen blanket. 80.86 g of a monomer mixture with composition; 66% styrene, 12% methacrylic acid, 10% methyl methacrylate, 8% glycidyl methacrylate and 4% hydroxypropyl methacrylate was added and mixed for 15 min. Then, a mixture of 31.10 g demineralized water and 4.04 g ammonium persulfate was added and held for 15 min. Following the hold, 727.82 g of a monomer mixture identical to the one above was fed in over 180 min. Additionally, a co-feed consisting of 121.30 g demineralized water, 1.73 g of 70% dodecylbenzene sulfonic acid in iPrOH and 0.24 g 28% ammonia was fed in over 180 min. Upon completion of the feeds, a mixture of 72.79 g demineralized water, 0.81 g ascorbic acid and 0.001 g iron (II) sulfate was added followed by a mixture of 8.09 g demineralized water and 2.02 g t-butyl perbenzoate. The reaction was held for 15 minutes and then cooled to obtain a white latex at 23.5% solids.

Coating Preparation 220.0 g of the resulting latex was blended with 3.17 g dimethylethanolamine, 14.0 g demineralized water, 18.93 g butyl Cellosolve and 18.93 g butanol mixing well between each addition. Films were prepared using #12 rod on rolled aluminum sheets and baked for 60 sec at 400° C.

Clear films were obtained with the following attributes:
Blush in boiling water: none observed
Color adsorption from beverage: none observed

What is claimed is:

1. A method of coating a can or packaging comprising:
    a) preparing a latex emulsion by:
        i) mixing an ethylenically unsaturated monomer component, a base, and a stabilizer comprising a strong acid to form a monomer emulsion; and
        ii) reacting the monomer emulsion with an initiator to form the latex emulsion;
    b) reacting the latex emulsion with a neutralizer to form a coating composition; and
    c) applying the coating composition to the can or packaging;
    wherein the strong acid has a dissociation constant pK, in aqueous solution, that is less than 4 and wherein the base includes at least one of ammonia, dimethylethanolamine, or 2-dimethylamino-2-methyl-1-propanol.

2. The method of claim 1, wherein the ethylenically unsaturated monomer component is present in an amount from about 2% to about 50% based on total mixture.

3. The method of claim 1, wherein the stabilizer comprises dodecylbenzene sulfonic acid.

4. The method of claim 1, wherein the stabilizer is present in an amount from about 0.1% to about 2.0% by weight polymeric solids.

5. The method of claim 1, wherein the reaction of step b) is conducted in the presence of a solvent.

6. The method of claim 1, wherein the carrier is present in an amount from about 50 to about 90% of the total latex emulsion.

7. The method of claim 1, wherein the initiator is present in an amount from about 0.001% to about 5% based on the weight of ethylenically unsaturated monomer component.

8. A can or packaging coated by the method of claim 1.

9. A coating composition prepared by a method comprising:
    a) preparing a latex emulsion by:
        i) in a carrier, mixing an ethylenically unsaturated monomer component and a stabilizer comprising a strong acid to form a monomer emulsion; and
        ii) reacting the monomer emulsion with an initiator to form the latex emulsion; and
    b) reacting the latex emulsion with a neutralizer to form the coating composition
    wherein the strong acid has a dissociation constant pK, in aqueous solution, that is less than 4 and wherein the ethylenically unsaturated monomer includes at least one multi-ethylenically unsaturated monomer component.

10. The coating composition of claim 9, wherein the neutralizer comprises ammonia, dimethylethanolamine, 2-dimethylamino-2-methyl-1-propanol, tributylamine, or a mixture thereof.

11. The coating composition of claim 9, wherein the neutralizer is present in an amount from about 0 to about 100% based on the amount of acid to be neutralized.

12. The coating composition of claim 9, wherein the reaction of step b) is conducted in the presence of a solvent.

13. The coating composition of claim 12, wherein the solvent is present in an amount from about 0 to about 90% by weight polymeric solids.

14. The method of claim 1, wherein the strong acid is not a sodium salt or a non-ionic surfactant.

15. The method of claim 1, wherein preparing the monomer emulsion includes mixing the ethylenically unsaturated monomer component, the base, and the strong acid in a carrier.

16. The method of claim 15, wherein preparing the monomer emulsion further comprises mixing at least one of benzyl (meth)acrylate or cyclohexyl (meth)acrylate in the carrier.

17. The coating composition of claim 9, wherein the stabilizer is present in an amount from about 0.1 to about 2.0 by weight polymeric solids.

18. The coating composition of claim 9, wherein the strong acid is not a sodium salt or a non-ionic surfactant.

19. The coating composition of claim 9, wherein preparing the monomer emulsion further comprises mixing at least one of cyclohexyl (meth)acrylate or benzyl (meth)acrylate in the carrier.

20. The coating composition of claim 9, wherein the multi-ethylenically unsaturated monomer component is chosen from allyl(meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol (meth)acrylate, polyalkylene glycol di(meth)acrylate, diallyl phthalate, trimethylolpropane tri(meth)acrylate, divinyl benzene, divinyltoluene, trivinylbenzene, or divinylnaphthalene.

21. The coating composition of claim 9, wherein the stabilizer comprises dodecylbenzene sulfonic acid.

22. A can or packaging coated with the coating composition of claim 9.

23. The coating composition of claim 9, wherein preparing the monomer emulsion further comprises mixing at least one of ammonia, dimethylethanolamine, or 2-dimethylamino-2-methyl-1-propanol in the carrier.

* * * * *